US012719879B2

(12) United States Patent
Sones

(10) Patent No.: US 12,719,879 B2
(45) Date of Patent: Aug. 25, 2026

(54) MULTI-ACCOUNT SECURITY IN CLOUD-BASED 5G NETWORK

(71) Applicant: Boost SubscriberCo L.L.C., Englewood, CO (US)

(72) Inventor: Nathan Sones, Englewood, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 160 days.

(21) Appl. No.: 18/544,820

(22) Filed: Dec. 19, 2023

(65) Prior Publication Data

US 2024/0372872 A1 Nov. 7, 2024

Related U.S. Application Data

(60) Provisional application No. 63/500,199, filed on May 4, 2023.

(51) Int. Cl.
*H04L 9/40* (2022.01)

(52) U.S. Cl.
CPC ........ *H04L 63/105* (2013.01); *H04L 63/0263* (2013.01); *H04L 63/104* (2013.01); *H04L 63/20* (2013.01)

(58) Field of Classification Search
CPC . H04L 63/105; H04L 63/0263; H04L 63/104; H04L 63/20; H04L 63/10
See application file for complete search history.

(56) References Cited

U.S. PATENT DOCUMENTS 11,019,101 B2 * 5/2021 Narayanaswamy .......................... G06F 21/6209
11,245,702 B2 * 2/2022 Anbalagan .......... H04L 63/1425
11,677,791 B1 * 6/2023 Dunkel ................. H04L 63/205 726/1
11,909,731 B1 * 2/2024 Dayan ................. H04L 63/0263
2009/0177675 A1 * 7/2009 Trumbull .............. H04L 63/102
2014/0223507 A1 * 8/2014 Xu .......................... H04L 67/10 726/1
2016/0378574 A1 * 12/2016 Hejlsberg ................ G06F 16/27 719/328

(Continued)

OTHER PUBLICATIONS

Kappes, Giorgos, Andromachi Hatzieleftheriou, and Stergios V. Anastasiadis. "Multitenant access control for cloud-aware distributed filesystems." IEEE Transactions on Dependable and Secure Computing 16.6 (2017): 1070-1085. (Year: 2017).*

(Continued)

*Primary Examiner* — Jung W Kim
*Assistant Examiner* — Sameera Wickramasuriya
(74) *Attorney, Agent, or Firm* — KW Law, LLP

(57) ABSTRACT

Systems, methods, and devices manage security controls associated with cloud accounts in a virtual private cloud. An example process includes retrieving native data and nonnative data for the cloud accounts. The cloud accounts comprise cloud roles that have access to cloud resources. Data for identities mapped to the cloud roles is retrieved. The identities are mapped in an identity management system. The retrieved native data for the cloud accounts, the retrieved nonnative data for the cloud accounts, and the retrieved data for the identities mapped to the cloud roles are compared to a security policy to identify a deviation in a cloud account from the cloud accounts. The cloud account is modified to remediate the deviation from the security policy.

20 Claims, 4 Drawing Sheets

(56) References Cited

U.S. PATENT DOCUMENTS

| | | | | |
|---|---|---|---|---|
| 2018/0375886 | A1* | 12/2018 | Kirti | H04L 67/10 |
| 2019/0020659 | A1* | 1/2019 | Loni | H04L 63/105 |
| 2019/0068627 | A1* | 2/2019 | Thampy | H04L 63/1425 |
| 2019/0098037 | A1* | 3/2019 | Shenoy, Jr. | H04L 63/1441 |
| 2020/0336489 | A1* | 10/2020 | Wuest | G06F 21/45 |

OTHER PUBLICATIONS

Tang, Xueyan, and Suiping Zhou. "Update scheduling for improving consistency in distributed virtual environments." IEEE Transactions on Parallel and Distributed Systems 21.6 (2009): 765-777. (Year: 2009).*

* cited by examiner

MULTI-ACCOUNT SECURITY IN CLOUD-BASED 5G NETWORK

CROSS-REFERENCE TO RELATED APPLICATIONS

This application claims priority to U.S. Provisional Patent Application No. 63/500,199, filed on May 4, 2023, and entitled "MULTI-ACCOUNT SECURITY IN CLOUD-BASED 5G NETWORK," which is incorporated by reference herein.

TECHNICAL FIELD

The following discussion generally relates to 5G telephone networks, and in particular to security controls for cloud user accounts in a cloud-based 5G network.

BACKGROUND

Wireless networks that transport digital data and telephone calls are becoming increasingly sophisticated. Currently, fifth generation ("5G") broadband cellular networks are being deployed around the world. These 5G networks use emerging technologies to support data and voice communications with millions, if not billions, of mobile phones, computers, and other devices. 5G technologies are capable of supplying much greater bandwidths than were previously available, so it is likely that the widespread deployment of 5G networks could radically expand the number of services available to customers. This expansion will accompany an increased need for cybersecurity.

The principal of least privilege is a security approach in which a user has only the minimum level of access required to function in their role. Applying least privilege access tends to restrict user accounts from accessing or modifying data that they should not, whether intentionally or accidentally. Least privilege can be difficult to apply when user groups grow and shrink regularly, or when users come on and off the system regularly. Access permissions also tend to drift over time as user roles within a company change, or as access used by policy or process implementations deviates from planned access.

Furthermore, a cloud-based 5G network can have accounts with both privileges and network structure. The network structure can be shared on multiple accounts or identities. Irregularities can appear in network structure or permissions across security groups or on access failures, for example. In a cloud-based environment, the cloud host can also refactor outside of the code base supporting the 5G network, which can cause account irregularities when virtualized resources are spun up. A need exists to detect and remediate such irregularities.

SUMMARY

Systems, methods, and devices of the present disclosure tend to enforce least privilege access on cloud accounts of a 5G data and telephone network. An example process for managing cloud accounts in a virtual private cloud includes retrieving native data and nonnative data for the cloud accounts. The cloud accounts comprise cloud roles that have access to cloud resources. Data for identities mapped to the cloud roles is retrieved. The identities are mapped in an identity management system. The retrieved native data for the cloud accounts, the retrieved nonnative data for the cloud accounts, and the retrieved data for the identities mapped to the cloud roles are compared to a security policy to identify a deviation in a cloud account from the cloud accounts. The cloud account is modified to remediate the deviation from the security policy.

Various embodiments can include writing nonnative data for the cloud accounts to a data source of a data collection system. Retrieving native data for the cloud accounts may include making an application programming interface (API) call to the virtual private cloud. The deviation can include assigned networking settings that are more permissive than network settings of the security policy in some examples. Modifying the cloud account can include modifying a security group associated with the cloud account, which may further include changing a routing rule or a firewall rule of the security group. An access permission may be removed from the cloud account to restrict access by the cloud account to a virtualized distributed unit, to a virtualized central unit, or to a virtualized network function. A data agent running in the virtual private cloud (VPC) may generate native data and nonnative data for the cloud account.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the illustrations.

DETAILED DESCRIPTION

The following detailed description is intended to provide several examples that will illustrate the broader concepts set forth herein, but it is not intended to limit the invention or the application and uses of the invention. Furthermore, there is no intention to be bound by any theory presented in the preceding background or the following detailed description.

Systems, methods, and devices of the present disclosure monitor and remediate account irregularities in a cloud-based 5G network. Since user accounts of a cloud-based 5G network can have both permission separation and network structure, irregularities across the network can be difficult to detect and remediate. For example, a group of user accounts might have access to a distributed unit in an east coast availability zone but may only use access to a distributed unit in a west coast availability zone. The security group in the example would be flagged for irregularities. User account data is pulled from a central management system or data storage system to detect such irregularities. Relevant account data for detecting irregularities typically includes account permissions, access logs, and security group configurations. Irregularities in security groups or access failures can be automatically detected and remediated by a security process running with elevated permissions.

As used herein, the term network function may describe a functional building block within a network infrastructure. Network functions typically include well-defined external interfaces and well-defined functional behavior. Network functions may be implemented in a cloud-based environment using virtualization tools such as, for example, virtual machines or containers. The systems described herein may thus spool up or retire network functions by launching a new instance or killing an existing instance of the network function. Examples of 5G core network functions suitable for virtualization and logging as described herein may include Application Function (AF), Access and Mobility Management Function (AMMF), Authentication Server Function (AUSF), Network Function Local Repository (NRF), Packet Forwarding Control Protocol (PFCP), Session Management Function (SMF), Unified Data Management (UDM), Unified Data Repository (UDR), or User Plane Function (UPF).

Figure 1:
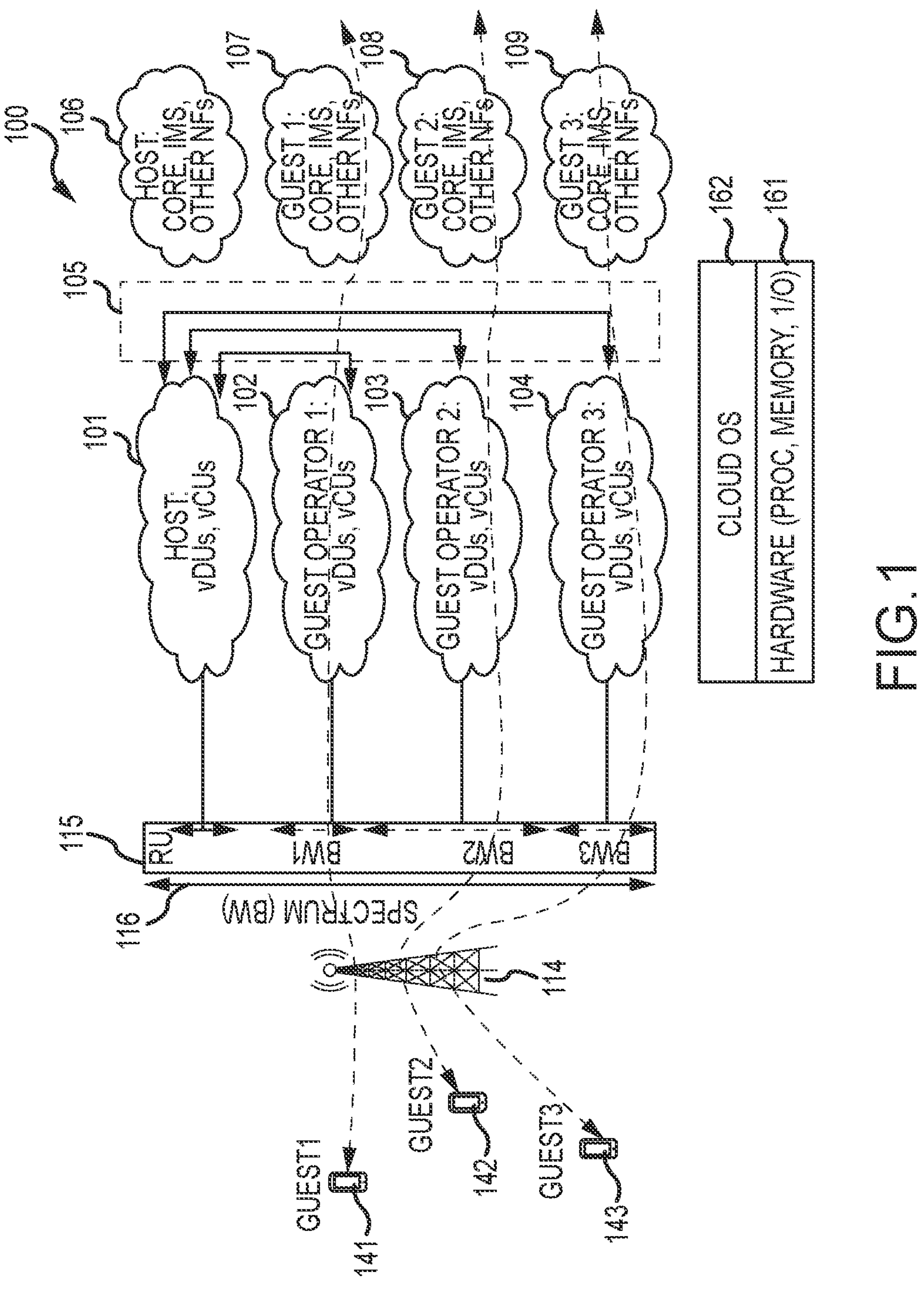
FIG. 1 illustrates an example of a 5G data and telephone network implemented using virtualized network functions, in accordance with various embodiments.

With reference now to FIG. 1, an example of 5G network 100 built on a cloud-based environment is shown, in accordance with various embodiments. 5G network 100 is implemented on cloud-based infrastructure to facilitate dynamic network adaptations. 5G network 100 includes a host operator maintaining ownership of one or more radio units (RUs) 115 associated with a wireless network cell. The example of FIG. 1 depicts a host operator operating a "radio/spectrum as a service (R/SaaS)" that allocates bandwidth on its own RUs for use by one or more guest network operators, though the systems, methods, and devices described herein could be applied to any wireless network using virtualized network functions. Examples of guest network operators may include internal brands of the host operator, system integrators, enterprises, external MVNOs, or converged operators. The host and guest network operators may maintain desired network functions to support user equipment (UE) 141, 142, 143.

Network functions typically have associated user accounts in the cloud-based system, and the associated user accounts can be separated into security groups. Security groups and user accounts separate access permissions and can also have network structure. Network structure associated with user accounts can control access and resources available in the underlying cloud network (e.g., AWS resources). Permissions can control access to infrastructure of 5G network 100.

In the example of FIG. 1, each RU 115 communicates with UE 141, 142, 143 operating within a geographic area using one or more antennas 114 (also referred to herein as towers) capable of transmitting and receiving messages within an assigned spectrum 116 of electromagnetic bandwidth. In various embodiments, guest networks 102, 103, 104 interact with a provisioning plane 105 to obtain desired spectrum across one or more of the RUs 115 operated by host network 101. Provisioning plane 105 allows guest network operators to obtain or change their assigned bandwidths on different RUs 115 on an on-demand and dynamic basis. Network services 107, 108, 109 may be maintained by guest operators and network services 106 may be maintained by host network 101. Network services and corresponding user accounts may be scaled up and down in response to network load, with logging for network functions occurring in real-time or near real-time.

The Open Radio Access Network (O-RAN) standard breaks communications into three main domains: the radio unit (RU) that handles radio frequency (RF) and lower physical layer functions of the radio protocol stack, including beamforming; the distributed unit (DU) that handles higher physical access layer, media access (MAC) layer, and radio link control (RLC) functions; and the centralized unit (CU) that performs higher level functions, including quality of service (QOS) routing and the like. The CU also supports packet data convergence protocol (PDCP), service data adaptation protocol (SDAP), and radio resource controller (RRC) functions. The RU, DU, and CU functions are described in more detail in the O-RAN standards, as updated from time to time, and may be modified as desired to implement the various functions and features described herein. In the example of FIG. 1, host network 101 maintains one or more DUs and CUs (i.e., network functions) as part of its own network. The DU communicates with one or more RUs 115, as specified in the O-RAN standard. The virtualized DUs and CUs assess port usage at predetermined intervals or in response to triggering events.

The various network components shown in FIG. 1 are typically implemented using software or firmware instructions that are stored in a non-transitory, tangible data storage (e.g., a disk drive, solid-state memory, or other storage medium) for execution by one or more processors in a computer-based system. The various components shown in FIG. 1 can be implemented using cloud computing hardware 161 and an appropriate operating system 162, such as the Amazon® Web Service (AWS) platform offered by Amazon Inc., although other embodiments could use other cloud platforms or any type of conventional physical computing hardware, as desired.

As illustrated in the example of FIG. 1, 5G network 100 includes a host network 101 and one or more guest networks 102, 103, 104. Host network 101 is typically operated by an organization that owns radio equipment and sufficient spectrum (potentially on different bands) to offer 5G capacity and coverage. Host network 101 provides 5G service to connected UEs, and it manages network services available to its own UEs or those of its guest operators. Host network 101 includes at least one DU and at least one CU, both of which will typically be implemented as virtual computing units using cloud resources.

Guest networks 102, 103, 104 operated by guest operators can manage their own networks using allocated portions of spectrum 116 handled by one or more of the RUs 115 associated with host network 101. Guest networks 102, 103, 104 communicate with one or more UEs 141-143 using allocated bandwidth on the host's RU 115. Guest networks 102, 103, 104 may include one or more virtual DUs and CUs, as well as other network services 106, 107, 108, 109. Generally, one or more guest operators will instantiate its own 5G virtualized network functions (e.g., CMS, vCUs, vDUs, etc.) using cloud-based resources. Guest and host operators can be associated with separate cloud-based user accounts, which can separate both access permissions and network structure, to access available 5G network functions and other resources.

Figure 2:
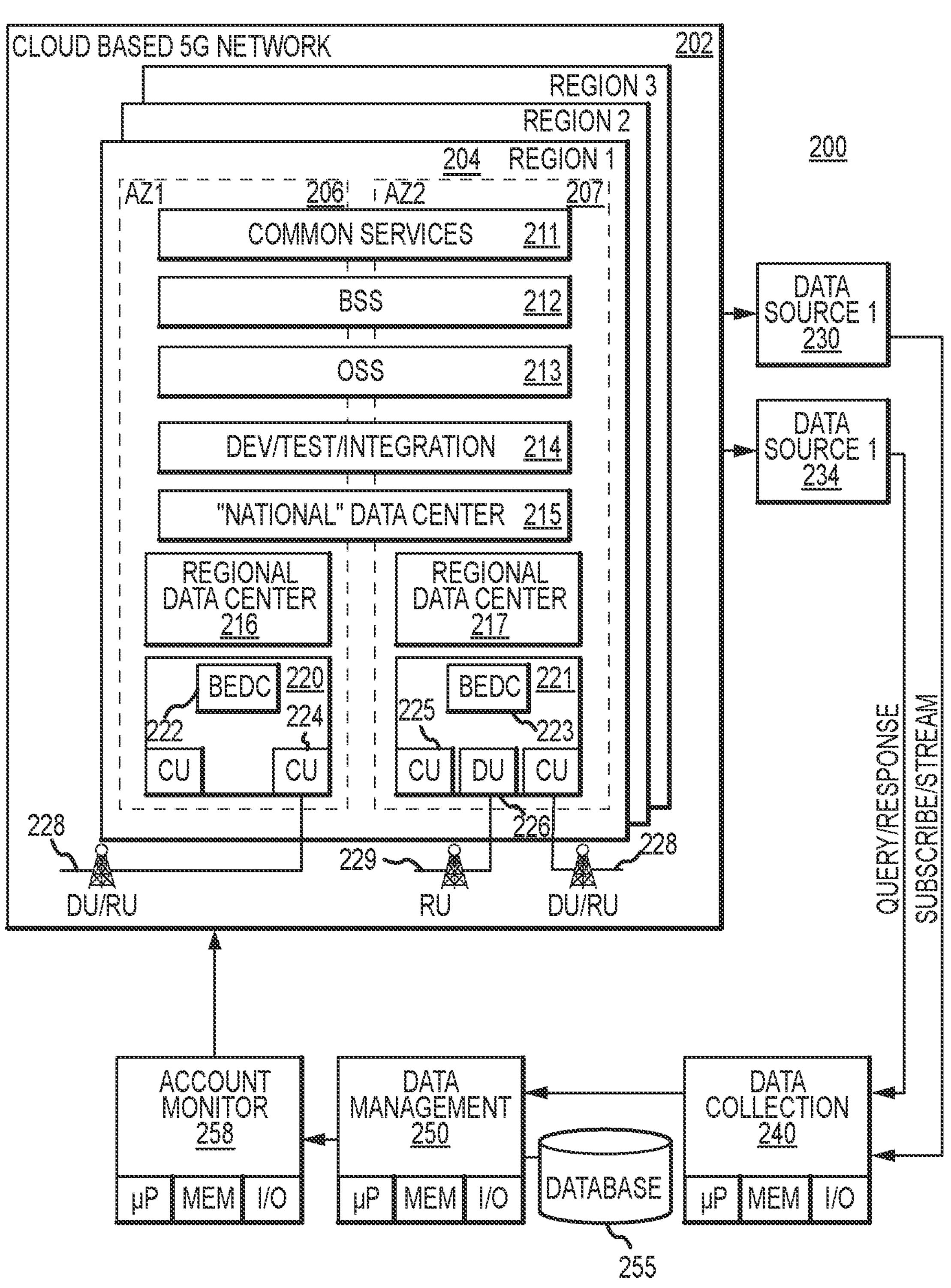
FIG. 2 illustrates an example of cloud infrastructure supporting a 5G data and telephone network, in accordance with various embodiments.

With reference to FIG. 2, an example of cloud environment 200 of 5G network 202 is shown, in accordance with various embodiments. In the example of FIG. 2, 5G network 202 represents the cloud-based backend infrastructure supporting 5G network 100 (of FIG. 1). 5G network 202 encompasses data processing services supporting multiple regions 204, each having one or more availability zones (AZs) 206, 207, and each acting as a separate data center with its own redundant power, network connectivity, and other resources. In some embodiments, the various AZs operating within the same region will provide redundancy in the event a neighboring AZ fails or is overloaded. New instances of network functions may be dynamically added to the network to support services of 5G network 100 of FIG. 1. User accounts and groups can have different network structure allowing different access and usage of underlying cloud resources in different availability zones 206, 207, regions 204, data centers, or the like.

The example of FIG. 2 illustrates three regions, with region 204 having two AZs 206, 207, although other embodiments could include any number of regions and AZs providing any number of services and resources. The regions and AZs are often described herein with reference to geographic locations, but in practice, the regions and AZs could be equivalently organized based upon customer density, user density, expected network demand, availability of electric power or bandwidth, or any other factors. As noted above, it will still be necessary to deploy RUs within broadcast range of end users. By implementing the other functions of the network using virtualized hardware operating within a cloud-type architecture, geographic restrictions on 5G network 202 can be reduced. This can provide substantial efficiencies in deployment and expansion of 5G network 202, while also allowing for more efficient use of computing resources, data storage, and electric power.

In example of FIG. 2, a network operator maintains ownership of one or more RUs 228, 229 associated with a wireless network cell. Each RU 228, 229 communicates with UE operating within a geographic area using one or more antennas. In the example illustrated in FIG. 2, common services (e.g., billing, guest network allocation, etc.) can be performed in a shared or common service 211 across the available AZs 206, 207. Typically, these shared services will be implemented within a common virtual private cloud (VPC) operating within the cloud environment. Similarly, shared VPC systems can support business support system (BSS) 212, operational support services (OSS) 213, development/test/integration features 214, or the like across the entire region. A region wide data center (identified as a "national" data center 215 in FIG. 2) could be implemented in a shared VPC across AZs 206, 207, if desired, with subordinate data centers (e.g., "regional" data centers 216, 217 in FIG. 2) being separated into different VPCs for each of the AZs 206, 207. Additional levels of data centers could be provided, if desired, or the different data center functions could be differently organized in any number of equivalent embodiments. Accounts can control access to various computing resources, various virtualized network functions, vDU, vCU, or other infrastructure of 5G network 100 (of FIG. 1) running on cloud environment 200.

In various embodiments, each AZ 206, 207 includes one or more breakout edge data centers (BEDCs) each supporting a local zone (LZ) with one or more RUs. The BEDCs are ideally organized for low latency with high throughput to the various UE operating within the LZ. BEDCs 222, 223 may host VPCs 220, 221 or other virtualization environments that typically implement one or more CUs 224, 225 in accordance with the O-RAN specifications. BEDCs may also implement user plane functions that handle user data sessions for gaming, streaming, and other network services. Again, any number of BEDCs and other data centers may be implemented using any number of different or shared VPCs in the cloud environment with user accounts of cloud environment 200 imposing limitations on accessible network infrastructure.

As noted above, each of the various network components shown in FIG. 2 is typically implemented using software or firmware instructions that are stored in a non-transitory data storage (e.g., a disk drive or solid-state memory) for execution by one or more processors within the VPC. VPCs may provide any number of additional features to support the data handling functions of the system, including redundancy, scalability, backup, key management, or the like.

In various embodiments that make use of a data pipeline, one or more data sources 230, 234 can be provided to obtain raw data from one or more of the components of 5G network 202. Data sources 230, 234 may receive data as part of a data stream, if desired. Other data sources 230, 234 may receive and maintain log data or the like from one or more associated components. Any number of streaming or query-based data sources 230, 234 may be deployed within cloud environment 200, as desired.

The streaming data source 230 will typically be configured to receive real-time data (or near real time data, accounting for some delays inherent in data processing, communications, and the like) from one or more network functions or other virtualized infrastructure of 5G network 202. Streaming data may be particularly useful for network components that generate substantial amounts of real-time data (e.g., access logs, failure logs, communication failures, etc.). Data source 230 will be configured to receive the data stream from the monitored network functions, instances, and user accounts as a consumer process executed by data source 230. Other embodiments may use different cloud-based architecture or may be configured in any other manner.

If desired, multiple components of 5G network 202 could supply streaming data to a common data source 230. Virtualized DU 226 and CU 224, 225 modules of 5G network 202 may write substantial amounts of real-time data that can be efficiently pipelined through a combined streaming data source 230 in some embodiments. Core network functions can also have logs streamed into data source 230. Logs can include real-time resource usage, security groups, access logging, or other logged information for virtualized computing units and underlying hardware and operating systems.

In the example of FIG. 2, data source 234 is shown as a query-based source that collects data from one or more components of 5G network 202. Data handled by query-based sources tends to be less reliant upon real-time delivery for status updates. Log data, fault metrics, performance metrics, and other types of time-series data may be particularly well-suited for query-type collection.

In one embodiment, query-based data source 234 is implemented for a pull-based data collection model using HTTP-type messaging. Software is configured to run on a computer server (implemented with conventional hardware or cloud-based resources, as desired) that queries the monitored components according to any desired time schedule to receive data. The data received in response to the queries may be locally cached in any sort of non-transitory memory (e.g., solid-state memory, magnetic or optical memory, cloud-based storage, or the like) for subsequent retrieval and processing, as desired. Query-based data sources may be particularly useful in tracking data produced by the various DUs, MTAs, and other components of the network that produce substantial amounts of log data. Typically, each component is configured to write its output/log data to data source 234.

In various embodiments, data collection system 240 can communicate with one or more data sources 230, 234 to obtain streaming or query-based data. In various embodiments, data collection system 240 subscribes to one or more data feeds or other streaming services associated with data source 230. Data collection system 240 may also be configured to perform queries against query-based data source 234. Data source 234 typically receives the requested or subscribed data, formats or filters the received data as appropriate, and forwards the collected data to a data management system 250 for storage, reporting, or any other further processing as desired. In an AWS-based example, an S3 data bucket could be the destination for a KINESIS Data Firehose stream. The S3 data bucket may comprise a notification queue, and the delivery stream may subscribe to the queue to deliver streaming data to the data bucket.

In various embodiments, data collection system 240 receives data in JSON or similar format, appends source or service location information as tags, or the like, and pushes the tagged data to the data management system 250 (using, e.g., HTTP structures, or the like). Generally, the data collection system will be configurable to specify batch sizes, delivery times, or other parameters for obtaining query-based data or for pushing collected data to data management system 250. Some embodiments may also filter the received data as desired to remove unwanted or unnecessary data that would otherwise consume excess storage in data management system 250. Other embodiments may perform additional monitoring, as needed.

Data management system 250 can be any data processing system capable of receiving the data from data source 234 and presenting the collected data for further use. In various embodiments, data management system 250 is a computer server implemented with conventional or virtual cloud-based hardware executing software for managing collected data. In various embodiments, data management system 250 stores received data in a database 255 (e.g., an S3 data bucket) for later retrieval, as desired. Data management system 250 could include, for example, ATHENA analytics capable of receiving and executing a query against database 255.

Account monitor 258 can directly retrieve account information from management systems hosted by the underlying cloud provider using a management console, application programming interface (API), streaming, or other techniques. Account monitor 258 can also retrieve account data from data management system 250. Account monitor 258 can be accessed and displayed visually in dashboard form, for example, and can display results from a query against data management system 250.

The example illustrated in FIG. 2 shows data sources 230, 234 as obtaining aggregated data from components of 5G network 202. This points out the relationships between the sources of data, data collection system 240, and data management system 250. In a practical implementation, however, data collection system 240 may be equivalently configured to subscribe to live data streams or to directly poll components of 5G network 202, without the need for separate data aggregation systems. The aggregated data can include security data for user accounts of the underlying cloud provider, access permissions, security groups, access logs, or other data related to user account configuration and usage.

In some equivalent embodiments, the functionality of data sources 230, 234 is designed into the components and user accounts of 5G network 202 themselves, thereby obviating the need for separate aggregation. One or more components or user accounts of 5G network 202 may be configured to supply a data stream directly to data collection system 240, for example. Similarly, data collection system 240 could posit queries directly to components of 5G network 202, if desired, without the need for intervening processing modules. Processed data is provided for delivery to the data management system 250 described above. In various embodiments, account monitor 258 provides data to data management system 250 using HTTP structures (e.g., HTTP "PUT" features), JSON, unstructured data, or the like. Other embodiments could implement the various functions and components described herein in any number of equivalent arrangements.

In operation, then, a data management system 250 obtains streaming or query-based data from one or more components and user accounts of a 5G wireless network operating within a cloud-based computing environment. The data is obtained directly from the component or account, or via intervening data sources 230, 234, that aggregate data from multiple data sources within 5G network 202. Collected data is tagged and filtered as desired, and the resulting data is delivered to a data management system for storage, reporting, or other actions as appropriate. Other embodiments may include other processing modules in addition to those illustrated, or may provide the various features and functions described herein using equivalent arrangements of processing modules and features.

Figure 3:
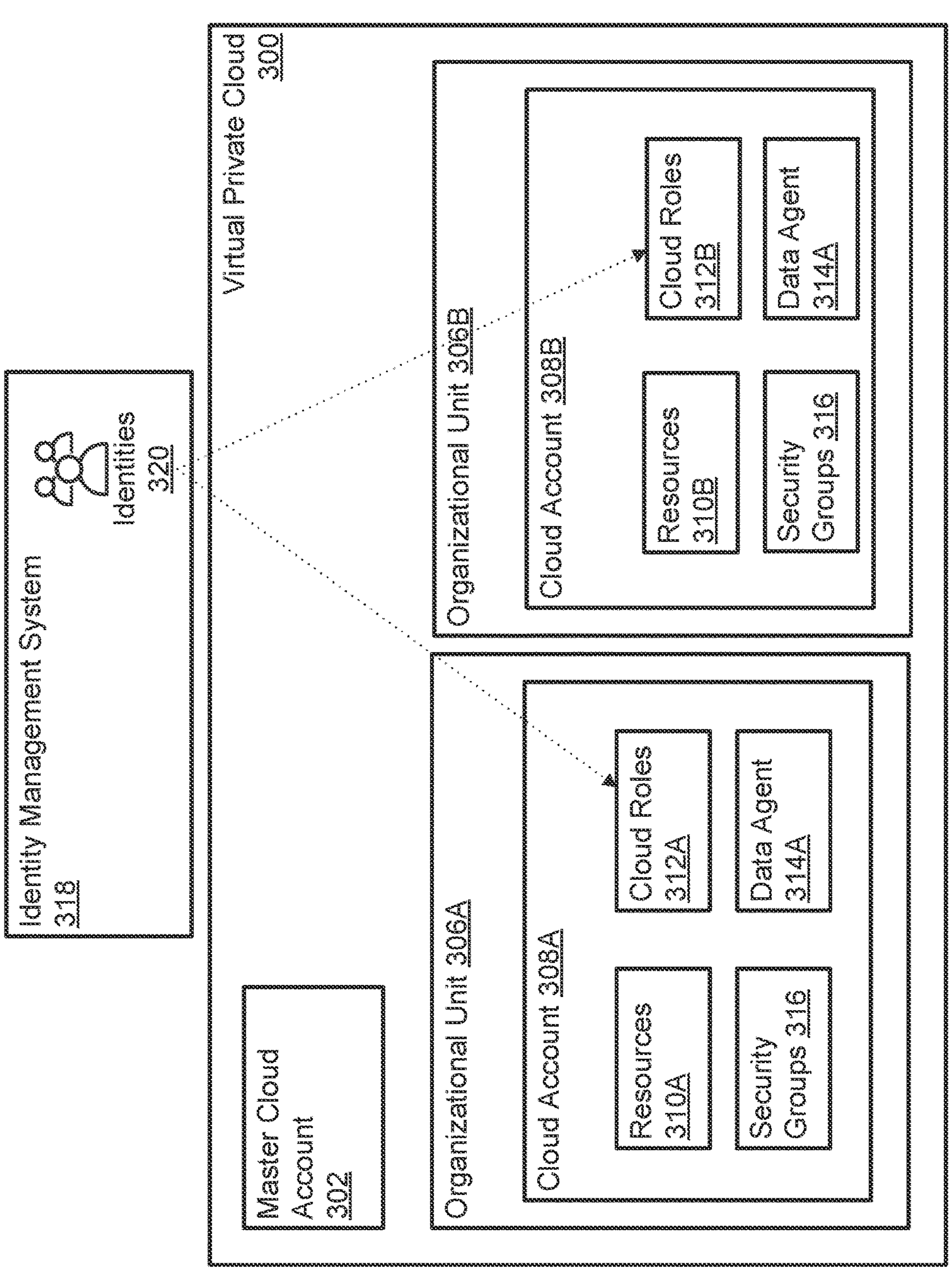
FIG. 3 illustrates an example account and identity structure in a virtual private cloud of a 5G data and telephone network, in accordance with various embodiments.

Referring now to FIG. 3, virtual private cloud (VPC) 300 is shown for implementing 5G network 202 (of FIG. 2), in accordance with various embodiments. In the example of FIG. 3, master cloud account 302 is a container for various resources such as workers, containers, virtualization infrastructure, logging tools, security controls, and other cloud resources. Large organizations such as 5G network 202 typically have hundreds or thousands of cloud accounts. Cloud accounts 308 are created as children of master cloud account 302, which can also be referred to as a root account or parent account. Cloud accounts can separate organizational units of 5G network 202 running on the same VPC 300.

Cloud infrastructure includes a master cloud account 302 owned and operated by host network 101 (of FIG. 1). The master cloud account has access to network resources made available by the underlying cloud provider. 5G network 202 may be divided into organizational units 306. Organizational units 306 could be created based on functional role, data center location, availability zones, or any other role divisible by resources made available on cloud-infrastructure. For example, organizational unit 306A could include accounts that run virtualized distributed units on cloud hardware, and organizational unit 306B could include accounts that run virtualized central units on cloud hardware. In another example, a single BEDC 222 (of FIG. 2) can have multiple organizational units 306 defined by separate cloud accounts 308.

A cloud account 308 is associated with all available cloud resources 310 in an organizational unit. In order to run applications, processes, workers, scripts, documents, virtualized network functions, data stores, or other cloud resources 310, an associated cloud role 312 within the same cloud account 308 makes a call. Security groups 316 are assigned to cloud resources and control the traffic that is allowed to reach and leave the associated resources. A single security group 316 can span or include resources 310 from multiple organizational units 306 to control traffic on VPC 300. For example, security groups 316 can control the ports, protocols, IP addresses, firewall rules, or other routing limits on network traffic. In that regard, cloud accounts 308 can include associated network structure.

The cloud roles are assigned identities 320 using an identity management system 318 or other identity management tools. Identities have login credentials and are more akin to traditional user accounts in Linux or Windows, where cloud accounts 308 as described herein include broader logical containers than typical Windows or Linux user accounts.

In some embodiments, an identity management system 318 including tools such as Active Directory and Okta could be used to assign identities 320 to cloud roles 312. Continuing the AWS example, identity and access management tools can be used to assign identities to cloud roles 312. Cloud roles 312 have access to VPC 300 and typically include security controls offered by the cloud provider hosting VPC 300.

Identities 320 are also capable of performing operations in virtualized components of 5G network 202. Tools native to VPC 300 may lack visibility into performance and behavior of virtualized network components. In that regard, identities 320 assigned to cloud roles 312 have additional permissions and security groupings operable in instances and applications running on cloud infrastructure that are undetectable by native tools of VPC 300. Cloud accounts 308 may include data agent 314A to generate account data for cloud accounts 308. The account data can be used as an input to data source 230 or data source 234 (of FIG. 2), for example, to gain visibility beyond the native capabilities of VPC 300. Identity management system 318 retains permission data, security group data, and other identity information and can also be in communication with data agents 314. In some embodiments, account data described herein includes identity permissions, security groups, usage, configuration, or other data retained by identity management system 318. Account data is retrieved to assess configuration and behavior of cloud accounts 308 and identities 320 assigned to cloud roles 312 within cloud accounts 308.

Figure 4:
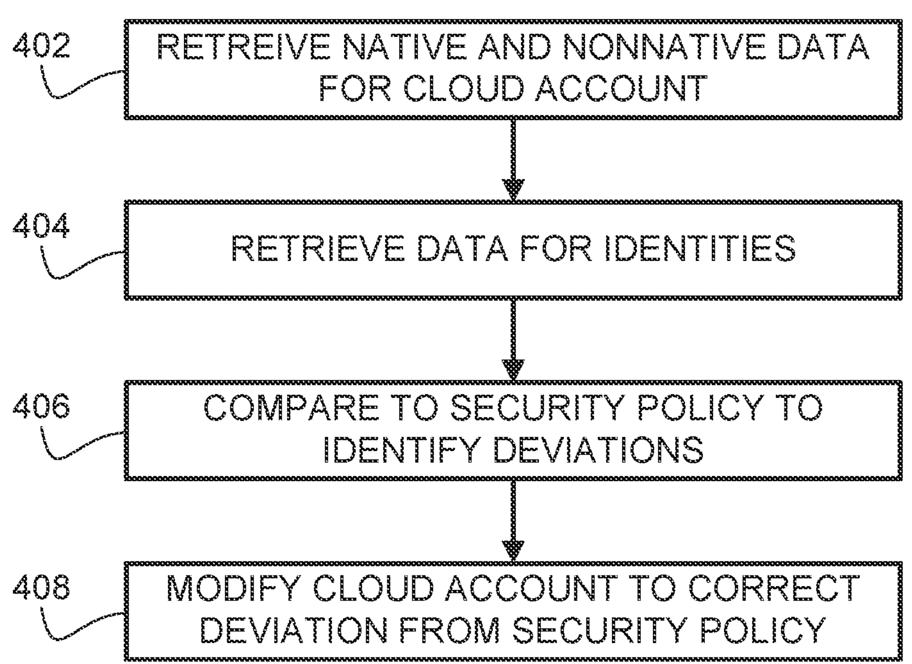
FIG. 4 illustrates an example process for remediating irregularities in a multi-account security structure of a 5G data and telephone network, in accordance with various embodiments.

With reference to FIG. 4 and continuing reference to FIG. 3, example process 400 is shown for managing security controls across multiple cloud accounts 308 and identities 320 assigned to associated cloud roles 312, in accordance with various embodiments. Process 400 may run on identity management system 318 on VPC 300 with privileges associated with master cloud account 302. Process 400 may run at one or more data centers identified in 5G network 202. Process 400 may also run from computing infrastructure outside of VPC 300.

In various embodiments, native and nonnative data is retrieved for cloud account 308 (Block 402). Data retrieved for cloud account 308 may include, for example, security group configurations, access data for cloud resources 310, configuration data for cloud accounts 308, network logs, user behavior analytics, and other data accessible through native interfaces offered by the cloud provider. Security group data can include routing tables, routing rules, communication ports, IP addresses, whitelists, blacklists, or other configuration data regarding network communication controls applied to security groups 316. Native data for cloud accounts is typically retrieved through an API, command line, or management console that interfaces with the cloud provider hosting VPC 300, though some embodiments can write native data to data sources 230, 234 (of FIG. 2). Nonnative data is typically collected and retrieved outside of the utilities offered by a cloud provider hosting VPC 300. Nonnative data may be collected by scraping entitlement management systems (EMS) of the cloud provider or by scraping security and health systems. By collecting native and nonnative data relating to cloud accounts 308 and identities 320, process 400 can assess security posture with improved resolution compared to the cloud provider hosting VPC 300.

Process 400 may retrieve data for identities 320 in some embodiments (Block 404). Data for identities 320 can include mapping data (e.g., between cloud roles 312 and identities 320), data from identity management system 318, or log data from applications or instances running on cloud resources 310 of VPC 300. Data relating to identities 320 is typically retrieved outside of the APIs and other interfaces natively offered by the cloud provider hosting VPC 300 using data agents 314 or outputting data to data sources 230, 234 (of FIG. 2).

In various embodiments, process 400 can compare the retrieved data to known security policies to identify deviations (Block 406). Process 400 may assess account permissions, some logs for heavy failures, or security group configurations, for example, to identify deviations from a security policy. In another example, deviations may occur when security groups 316 implement networking rules that are more permissive than a known network policy. Based on the data retrieved for cloud account 308, a security group 316 may be identified as having a permissive configuration (e.g., quad zero configuration) allowing all inbound and outbound network communication. The known security policy for cloud account 308 may be to assign security groups 316 that restrict all incoming communication at the boundary of VPC 300. The identified deviation in security group 316 would be the routing rule that is more permissive than the known security policy of limiting communications at the boundary of VPC 300.

In various embodiments, process 400 modifies cloud account 308 (of FIG. 3) to correct the identified deviation from the known security policy (Block 408). The corrective steps may be stored in association with the known security policy. Continuing the example above, process 400 corrects the permissive rule in security group 316 by modifying the portion of security group 316 that allows communication beyond the boundary of VPC 300. The correction may be implemented using native tools offered by the cloud provider hosting VPC 300. The correction may be implemented using identity management system 318 to change access permissions associated with an identity. The correction may be implemented by modifying access permissions associated with a cloud role 312. The correction may be implemented by flagging the deviation for human review and intervention. For example, the deviation and supporting data and comparison can be displayed in a centralized dashboard of account monitor 258 (of FIG. 2).

Systems, methods, and devices of the present disclosure tend to implement least privilege access by identifying security rules that deviate from a known security policy. Aggregated account data across VPC 300 and identity management system 318 can be analyzed and displayed at a central location. Aggregation tends to increase visibility into systemic deviations from a known security policy that span across multiple cloud accounts 308 or identities 320. Automatic remediation and remediation suggestions improve response time to implement corrective security controls. The tighter security controls tend to restrict unpermitted or unwanted access to cloud-based components of a data and telephone network such as, for example, vDUs, vCUs, or virtualized network functions.

Benefits, other advantages, and solutions to problems have been described herein with regard to specific embodiments. Furthermore, the connecting lines shown in the various figures contained herein are intended to represent exemplary functional relationships or couplings between the various elements. It should be noted that many alternative or additional functional relationships or connections may be present in a practical system. However, the benefits, advantages, solutions to problems, and any elements that may cause any benefit, advantage, or solution to occur or become more pronounced, are not to be construed as critical, required, or essential features or elements of the inventions.

The scope of the invention is accordingly to be limited by nothing other than the appended claims, in which reference to an element in the singular is not intended to mean "one and only one" unless explicitly so stated, but rather "one or more." Moreover, where a phrase similar to "A, B, or C" is used herein, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises," "comprising," or any other variation thereof, are intended to cover a non-exclusive inclusion, such that a process, method, article, or device that comprises a list of elements does not include only those elements but may include other elements not expressly listed or inherent to such process, method, article, or device.

The term "exemplary" is used herein to represent one example, instance, or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process for managing cloud accounts in a virtual private cloud (VPC), comprising:

retrieving native data and nonnative data for the cloud accounts in an organizational unit comprising virtual distributed units (vDUs), wherein the cloud accounts comprise cloud roles that have access to cloud resources available in the VPC to the vDUs of the organizational unit, wherein the nonnative data is scraped from an entitlement management system (EMS);

retrieving data for identities mapped to the cloud roles, wherein the identities are mapped in an identity management system;

comparing a security policy with the retrieved native data for the cloud accounts, the retrieved nonnative data for the cloud accounts, and the retrieved data for the identities mapped to the cloud roles to identify a deviation from the security policy by a cloud account in the organizational unit for the vDUs; and modifying the cloud account by editing a routing rule available to the vDUs to remediate the deviation from the security policy.

2. The automated process of claim 1, further comprising writing nonnative data for the cloud accounts to a data source of a data collection system.

3. The automated process of claim 1, wherein retrieving native data for the cloud accounts comprises making an application programming interface (API) call to the virtual private cloud.

4. The automated process of claim 1, wherein the deviation comprises assigned networking settings that are more permissive than network settings of the security policy.

5. The automated process of claim 1, wherein modifying the cloud account comprises modifying a security group associated with the cloud account.

6. The automated process of claim 5, wherein modifying the security group associated with the cloud account comprises changing the routing rule or a firewall rule of the security group.

7. The automated process of claim 1, further comprising removing an access permission from the cloud account to restrict access by the cloud account to a virtualized distributed unit.

8. The automated process of claim 1, further comprising removing an access permission from the cloud account to restrict access by the cloud account to a virtualized central unit.

9. The automated process of claim 1, further comprising removing an access permission from the cloud account to restrict access by the cloud account to a virtualized network function.

10. The automated process of claim 1, further comprising generating, by a data agent running in the VPC, native data and nonnative data for the cloud account.

11. A computer-based system for managing cloud accounts in a virtual private cloud (VPC), comprising:

a processor; and a tangible, non-transitory memory configured to communicate with the processor, the tangible, non-transitory memory having instructions stored thereon that, in response to execution by the processor, cause the computer-based system to perform operations comprising:

retrieving native data and nonnative data for the cloud accounts in an organizational unit comprising virtual distributed units (vDUs), wherein the cloud accounts comprise cloud roles that have access to cloud resources available in the VPC to the vDUs of the organizational unit, wherein the nonnative data is scraped from an entitlement management system (EMS);

retrieving data for identities mapped to the cloud roles, wherein the identities are mapped in an identity management system;

comparing a security policy with the retrieved native data for the cloud accounts, the retrieved nonnative data for the cloud accounts, and the retrieved data for the identities mapped to the cloud roles to identify a deviation from the security policy by a cloud account in the organizational unit of the vDUs; and modifying the cloud account by editing a routing rule available to the vDUs to remediate the deviation from the security policy.

12. The computer-based system of claim 11, wherein the operations further comprise writing nonnative data for the cloud accounts to a data source of a data collection system.

13. The computer-based system of claim 11, wherein retrieving native data for the cloud accounts comprises making an application programming interface (API) call to the virtual private cloud.

14. The computer-based system of claim 11, wherein the deviation comprises assigned networking settings that are more permissive than network settings of the security policy.

15. The computer-based system of claim 11, wherein modifying the cloud account comprises modifying a security group associated with the cloud account.

16. The computer-based system of claim 15, wherein modifying the security group associated with the cloud account comprises changing the routing rule or a firewall rule applicable to the security group.

17. The computer-based system of claim 11, wherein the operations further comprise removing an access permission from the cloud account to restrict access by the cloud account to a virtualized distributed unit, a virtualized central unit, or a network function.

18. A non-transitory, tangible computer readable storage medium having instructions stored thereon that, in response to execution by a computer-based system, cause the computer-based system to manage cloud accounts in a virtual private cloud (VPC) by performing operations, the operations comprising:

retrieving native data and nonnative data for the cloud accounts in an organizational unit comprising virtual distributed units (vDUs), wherein the cloud accounts comprise cloud roles that have access to cloud resources available in the VPC to the vDUs of the organizational unit, wherein the nonnative data is scraped from an entitlement management system (EMS);

retrieving data for identities mapped to the cloud roles, wherein the identities are mapped in an identity management system;

comparing a security policy with the retrieved native data for the cloud accounts, the retrieved nonnative data for the cloud accounts, and the retrieved data for the identities mapped to the cloud roles to identify a deviation from the security policy by a cloud account in the organizational unit for the vDUs; and modifying the cloud account by editing a routing rule available to the vDUs to remediate the deviation from the security policy.

19. The non-transitory, tangible computer readable storage medium of claim 18, wherein the operations further comprise writing nonnative data for the cloud accounts to a data source of a data collection system.

20. The non-transitory, tangible computer readable storage medium of claim 18, wherein the operations further comprise removing an access permission from the cloud account to restrict access by the cloud account to a virtualized distributed unit, a virtualized central unit, or a network function.

* * * * *